(No Model.)
G. I. EWERS.
AUTOMATIC GAS BURNER.
No. 515,758. Patented Mar. 6, 1894.
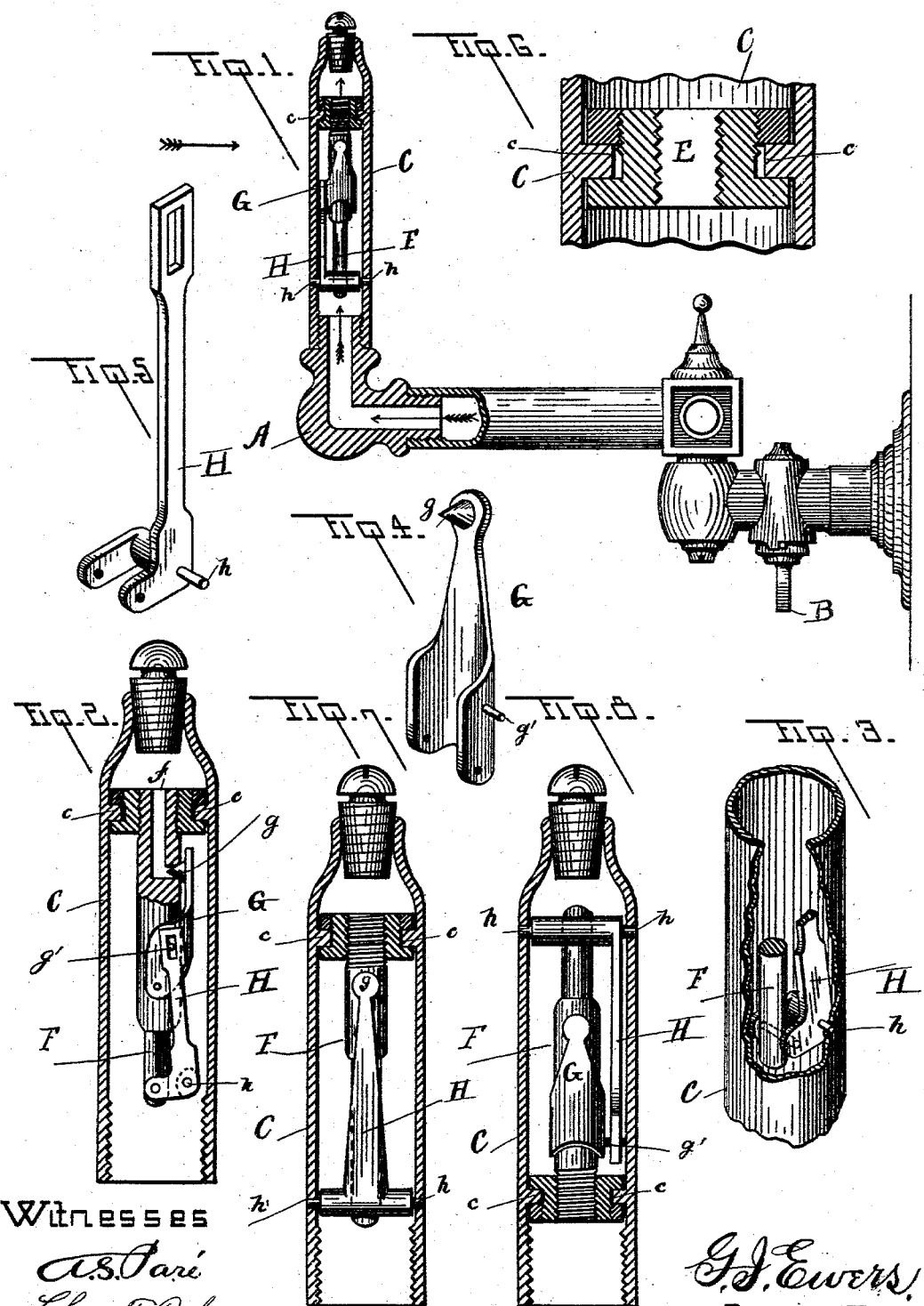
Witnesses
A. S. Paré
Chas. T. Behan
G. I. Ewers,
Inventor

UNITED STATES PATENT OFFICE.

GEORGE I. EWERS, OF SAN FRANCISCO, CALIFORNIA.

AUTOMATIC GAS-BURNER.

SPECIFICATION forming part of Letters Patent No. 515,758, dated March 6, 1894.

Application filed February 16, 1893. Serial No. 462,935. (No model.)

*To all whom it may concern:*

Be it known that I, GEORGE I. EWERS, a citizen of the United States, residing in the city and county of San Francisco and State of California, have invented a new and useful Automatic Gas-Burner, of which the following is a specification.

My invention relates to improvements in gas-burners in which the outflow of gas is controlled by means of a valve or stop operated by expansion and contraction of the burner-shell; and the object of my improvements is to provide a gas-burner that will automatically stop the flow of gas whenever combustion of the latter ceases; and that will also prevent gas from escaping when the same by accident becomes turned on at the stop-cock. I attain this object by the mechanism hereinafter described, and illustrated in the accompanying drawings, in which—

Figure 1 is a vertical sectional view of my burner, showing it attached to the gas-bracket. Fig. 2 is also a vertical sectional view, looking from the left of Fig. 1, in the direction of the arrow. Fig. 3 is a broken detail view in perspective; and Figs. 4, 5 and 6 are detail views. Figs. 7 and 8 show some modifications in the arrangement of the interior parts, which will be explained.

Similar letters refer to similar parts throughout the several views.

Referring to Figs. 1 to 6 inclusive, A is the end of the gas-bracket or pipe which conducts gas to the burner, B is the ordinary stop-cock by which gas is admitted to and shut off from the burner, C is the exterior shell or inclosure of the burner. It is composed of expansible material (aluminum or copper is very suitable) and has its lower end adapted to screw or fit onto the pipe A, and its upper end is suited to hold the ordinary burner-tip, heat from which expands said shell, and the expansion thereof operates the interior mechanism of the burner, as will be shown farther on. On the inside and near the upper end of the shell C, and formed integrally therewith is an annular flange or rib $c$, serving to secure an adjusting nut, E. The nut E has a flange or projecting rim around either end, and one of these rims is made separable so that it can be removed to allow said nut to be put in proper place within the circle of the flange $c$. When the nut has thus been placed the movable rim is forced or screwed onto it until both rims are brought firmly against the flange $c$. The movable rim is then soldered or otherwise made fast to the nut and the latter is thus permanently secured to the flange $c$ so as to have no play excepting that it may be turned. The nut E is designed to hold the upper end, which is screw-threaded, of a bar or rod, F, composed of material less expansible than the shell, and said bar is rendered adjustable by said nut. Turning the latter in one direction raises the bar, and turning it in the opposite direction lowers it. This feature not only makes it easy to adjust the burner, but it facilitates in putting the burner together. The bar F fits gas tight in the nut E, and has a gas-passage hole, $f$, made in its upper end, which extends into it lengthwise for a short distance and then opens out into the chamber of the shell, forming a valve port. Owing to the tight fittings between the bar F and the nut E, and between the latter and the flange $c$ there is no opening through which gas can pass from the shell chamber below the nut E to the burner-tip, excepting through the aperture $f$, which latter affords a direct outlet, but which is controlled and normally kept closed by means of a valve, $g$, attached to an arm or shank, G, supported upon the bar F. The lower end of the bar F has pivotal connection with the lower part of a lever, H, and serves to communicate the expansion motion of the shell C to the lever H. Said lever consists of a lower transverse bearing part and an upward-extending bar formed integrally therewith. It is sustained at its lower end upon a fulcrum-pin or pivots, $h\,h$, in the lower part of the shell C, and its upper end has a sliding-pivotal connection, $g'$, with the valve-arm G, whereby said lever operates said arm, and thereby opens and closes the valve $g$. It will be seen that as the shell C is fixed at its lower end to the pipe A any expansion that it may undergo must of necessity be upward. It will also be manifest that as the nut E secures the bar F firmly to the upper part of the shell C expansion of said shell will raise said bar, and contraction will lower it. Now, keeping the foregoing in mind, and further observing that the lower end of the bar F is pivotally connected with the lever H, near the fulcrum of the latter, as shown in Figs. 2 and 3, it will be obvious that the bar F affords a medium through which the expansion and contraction motion of the shell C is transmitted to the lever H. Hence, it will further be seen that if the shell C be expanded its upward dilation will bring force to bear upon the lever H, through the bar F, and cause said lever to turn about its fulcrum $h\ h$, with increased movement at its upper end, and in the proper direction to operate the arm G, through the connection $g'$ so as to unseat the valve $g$ and open the gas-passage $f$. By this arrangement, if the bar F be moved downward by contraction of the shell it will cause the lever H to move in an opposite direction and the valve $g$ to close.

My improved burner operates as follows: The cock B having been turned on, a burning match or other flame is applied to the shell C, and as the latter begins to warm it expands and elevates the bar F, and said bar through its connection with the lever H moves the latter and opens the valve $g$. This allows the gas to flow through the passage $f$ and out of the burner tip at which point it is ignited and the combustion thereof continues to keep the shell C warm and expanded and the supply valve $g$ open so long as the gas burns, but as soon, however, as the flame in any manner becomes extinguished the shell begins to cool and contract and lower the bar F, and that moves the lever H and again closes the valve $g$ and prevents the gas from further escaping while the burner is cool. Thus it will be seen that I have a self-acting burner that will always close upon cooling and shut off the gas independently of the stop-cock. The valve $g$ might be attached to the upper end of the lever H (as shown in Fig. 7) and operated directly by the oscillation of the latter instead of being provided with the shank or arm G and attached to the bar F, but the latter arrangement is the more suited to overcome side play which might result in the valve not accurately and perfectly closing.

Now referring to Fig. 8,—if desired the flange $c$ can be made in the lower part of the shell C instead of in the upper part, the nut E be fastened to said flange in the lower part of the shell in the same way as I have described it fastened in the upper part, and the bar F and lever H be reversed so that the latter will have its fulcrum and connection with the bar F in the upper part of the shell instead of in the lower part, and so that the tubulous end of the bar F will be secured by the nut E in the lower part of the said shell instead of in the upper part. This will leave the connection between the valve-shank G and the lever H substantially the same, only that it will be in the lower part of the shell instead of in the upper part. The valve $g$ will also be in the lower part of the shell, but will be substantially the same as I have hereinfore described it. In this arrangement of the parts the expansion and contraction of the shell will act directly upon the lever H, through the pivots $h\ h$, instead of through the bar F, and the result will be substantially the same in both constructions.

Having thus described my invention, what I claim as new, and desire to secure by Letters Patent, is—

1. In a gas-burner, the combination of a burner-shell, a lever fulcrumed within said shell, a bar or rod having one end connected with said lever and the other end secured gas-tight within the shell, a gas-passage through the secured part of said bar for the passage of gas to the burner, and a suitable valve connected with and operated by the aforesaid lever to close and open said gas-passage, substantially as herein described.

2. In a gas-burner, an expansible inclosing shell having its lower end adapted to connect with a supply-pipe and its upper end suited to receive a burner-tip, an annular flange or rib on the inside of said shell, a nut firmly fastened to said flange, a bar or rod within the shell, secured at one end and rendered adjustable by said nut, said bar being composed of material less expansible than the shell, a hole made through the secured part of said bar for the passage of gas, a valve adapted to close and open said hole, said valve being attached to an arm or shank pivoted to the bar, and a lever fulcrumed within the shell and having connection with the valve-shank and also with the aforesaid bar, and acting to open and close the valve, substantially as herein described.

3. The combination, in a gas-burner, of an inclosing shell, a partly tubular bar or rod placed therein, said bar and the inclosing shell having different expansibility, suitable means whereby one end of said bar is secured to the shell and rendered adjustable and all flow of gas therepast is shut off except through the aperture of the bar, a suitable valve placed in control of said aperture to control the outflow of gas, said valve having leverage connection with the inclosing shell and the bar whereby their unequal expansion and contraction under the influence of heat and cold will operate said valve, substantially as herein described.

4. In a gas-burner, the combination of a distensible inclosing shell, a lever having pivotal bearings within said shell, a bar or rod composed of material less expansible than the shell, having one end fixed to said shell and the other end connected with the lever, a gas-passage opening made through the fixed part of the bar, a conic valve controlling said opening, said valve having a shank with pivotal bearings upon the aforesaid bar and connection with the aforesaid lever whereby said valve is operated, substantially as herein described.

5. The combination, in a gas-burner, of an expansible shell, a non-expansible bar or rod, and a lever so arranged and connected therewith that the expansion and contraction of said shell will cause said lever to move to operate a valve, substantially as herein set forth.

6. In a gas-burner, the flanged shell C, the adjusting nut E, the partly tubular bar F and attached valve-shank G, the conic valve g, and actuating lever H pivotally connected with the bar F and valve-shank G, substantially as herein described.

In testimony whereof I have hereunto set my hand in presence of two witnesses.

GEORGE I. EWERS.

In presence of—
FREDERICK BOWMAN,
GEORGE MERRITT.